Nov. 9, 1965     K. C. HANSEN     3,216,251
LIQUID MEASURING APPARATUS
Filed May 21, 1963     2 Sheets-Sheet 2

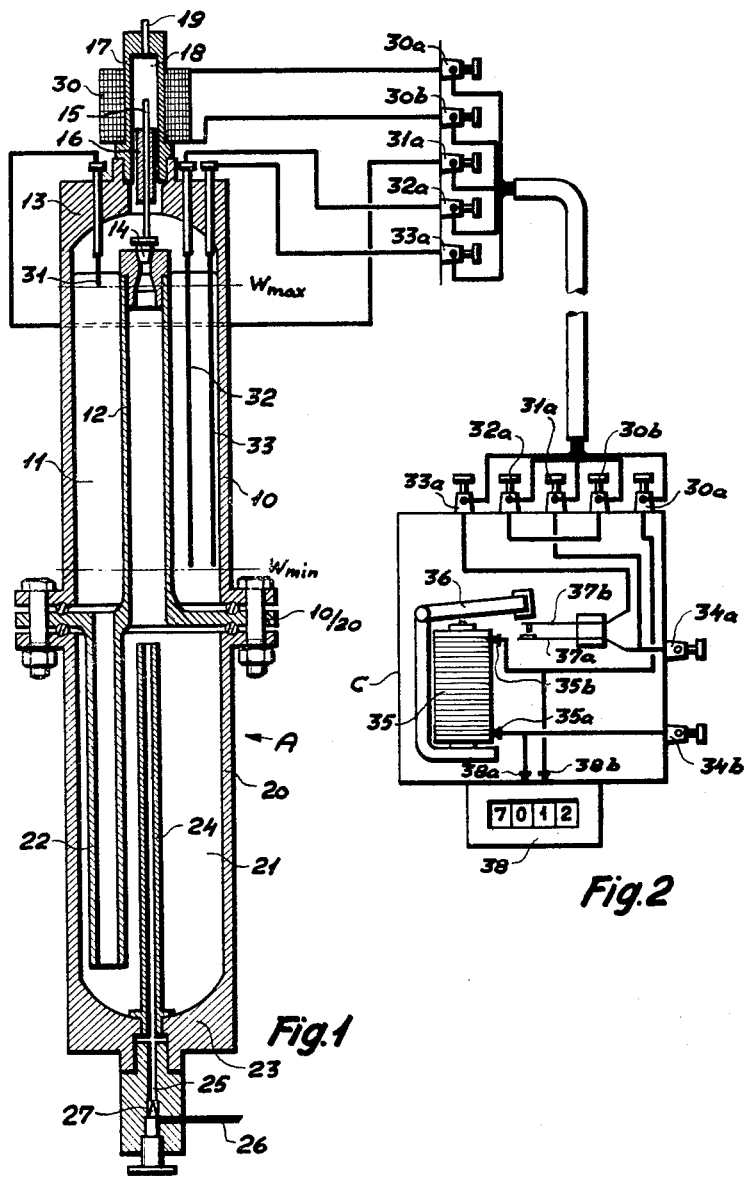

INVENTOR.
KAJ CHRISTIAN HANSEN

United States Patent Office 3,216,251
Patented Nov. 9, 1965

3,216,251
LIQUID MEASURING APPARATUS
Kaj Christian Hansen, 70 Fuglegaardsvenget,
Gentofte, Denmark
Filed May 21, 1963, Ser. No. 282,031
Claims priority, application Denmark, June 15, 1962,
2,662/62
2 Claims. (Cl. 73—223)

This invention relates to means for automatically delivering measured quantities of liquid, hereinafter referred to as the "primary liquid," and more particularly to oil meters for measuring the consumption of fuel oil in oil distribution systems comprising a central tank and a plurality of consumer lines supplied from said tank.

One object of the invention is to provide an inexpensive and extremely accurate apparatus for measuring the consumption of fuel oil in each supply line of such oil distribution systems.

Another object is to provide an improved liquid meter having no rotating components or mechanical transmission devices and which, therefore, requires practically no tools or machinery for its manufacture.

With these and other objects in view, the invention consists in the construction, arrangement and combination of parts hereinafter described and particularly pointed out in the claims, it being understood that the invention is not limited to details of construction nor to any particular use of the apparatus although, in the following description with reference to the drawings, it will be described in connection with fuel oil measuring apparatus.

In the drawings:

FIGURE 1 is a vertical cross-section view of an apparatus according to the invention;

FIGURE 2 is a diagram of a central circuit pertaining to the apparatus of FIGURE 1;

Figures 3, 4, 5:
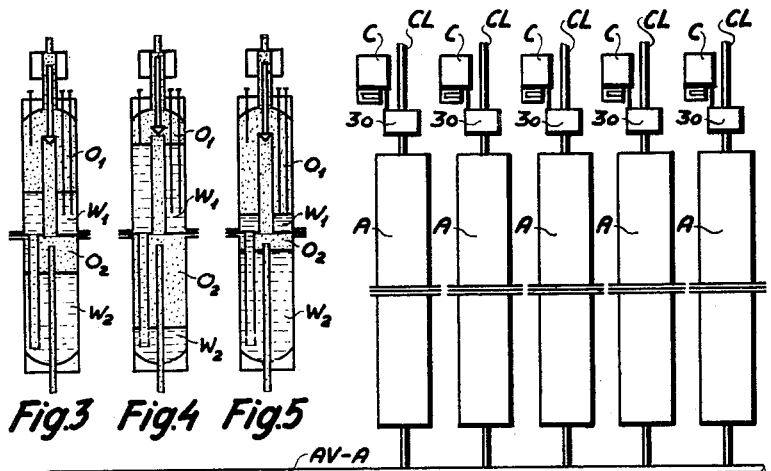
FIGURES 3, 4 and 5 are vertical cross-section views schematically illustrating the operation of the apparatus.

Referring in detail to the drawings, and first with particular reference to FIGURE 1, there is illustrated an apparatus generally designated as A and comprising the following components:

The main component of this apparatus is a receptacle comprising an upper part 10 and a lower part 20 separated by a partition 10/20 dividing the interior of the receptacle into an upper chamber 11 and a lower chamber 21.

A pipe 12 extends upwardly from the partition 10/20 into the upper chamber 11 and communicates at its lower end with the lower chamber 21. A second pipe 22 extends downwardly from the partition 10/20 into the lower chamber 21 and communicates with both chambers.

A third pipe 24 extends upwardly from the bottom 23 of the lower chamber 21 and communicates through a channel 25 in the bottom 23 with an oil supply line 26, an adjustable throttle valve 27 being inserted therebetween. The oil inlet pipe 24 is preferably disposed coaxially with the pipe 12 in the upper chamber 21 and terminates adjacent the lower end of said pipe in the partition 10/20.

The pipe 12 terminates in the upper part of the upper chamber 11 adjacent the top 13 of the receptacle and is provided at its upper end with an electromagnetically operated valve 14 mounted at the lower end of a stem 15, the other end of which is connected with an iron core 16 actuated by an electromagnet 30.

The electromagnet 30 is mounted on a tubular housing 17 of a non-ferrous material in which the core 16 is guided and the interior of which 18 communicates with an oil discharge pipe 19.

Mounted in the upper part of the receptacle 10 are three electrodes 31, 32 and 33 extending from the top 13 of the receptacle downwardly into the upper chamber 11. The two electrodes 32 and 33 are of equal length and terminate adjacent the bottom of the chamber 11, whereas the third electrode 31 is substantially shorter than the two others terminating in the upper part of the upper chamber 11.

For reasons which will be explained in the following description of the operation of the apparatus, a horizontal plane through the lower end of the electrode 31 will be referred to as the "upper level" and is designated as $W_{max}$, and similarly a horizontal plane through the lower ends of electrodes 31 and 32 will be referred to as the "lower level" and is designated as $W_{min}$.

Finally, the apparatus A comprises—as an essential component thereof—a liquid, hereinafter referred to as the "secondary liquid," having a higher specific gravity and a higher electric conductivity than the primary liquid. This secondary liquid which in the practical embodiment of the apparatus may be water comprising a small quantity of an electrolyte so as to provide for a suitable conductivity is designated as W, whereas the oil which is to be measured in the apparatus and which constitutes the primary liquid is designated as O.

The three electrodes 31, 32 and 33 and the electromagnet 30 are connected to the terminals of the control circuit shown in FIGURE 2 and comprising the following components.

A source of electrical power represented by a pair of terminals 34a and 34b, a relay 35 having terminals 35a and 35b, and an armature 36 cooperating with a pair of contacts 37a and 37b, the terminals 30a and 30b of the electromagnet 30 and the terminals 31a, 32a and 33a of the electrodes 31, 32 and 33 respectively.

Operatively associated with the relay 35 is an electromagnetically operated counter 38 having terminals 38a and 38b connected in parallel with the terminals 35a and 35b of the relay 35.

The interconnection of the components in FIGURE 2 and the function of the control circuit controlling the operations of the apparatus shown in FIGURE 1 will be explained in the following description of the operation with reference to FIGURES 1–5.

*Operation*

Fundamentally, the function of the apparatus according to the invention depends on the co-action of the two liquids within the receptacle, the principle of operation being as follows:

Oil flowing under pressure into the lower chamber 21 through the inlet pipe 24 will exert a pressure on the surface of the secondary liquid, hereinafter referred to as water, contained in the lower part of the chamber 21 which serves as a water reservoir. When the valve 14 is closed the oil O will press the water W through the pipe 22 into the upper chamber 11, and the water will continue to rise therein, until it has reached the upper level $W_{max}$. Simultaneously, a quantity of oil $O_1$, see FIGURES 3, 4 and 5, above surface of the water $W_1$ in the upper chamber is discharged through the chamber 18 and the discharge pipe 19. When the water level in the upper chamber 11 has reached the upper level $W_{max}$ as shown in FIGURE 4, the electrode 31 will be connected with electrodes 32 and 33 through the water, and the electromagnet 30 will be actuated so as to open the valve 14. The water will then sink through the pipe 22 down to the reservoir $W_2$ at the bottom of the lower chamber 21, thereby pressing the oil $O_2$ in the upper part of the lower chamber 21 through the pipe 12, now open at its upper end, into the upper chamber where it mixes with the oil $O_1$ and is pressed out through the chamber 18 and discharge pipe 19. At the same time, the oil $O_2$ fed into the lower chamber through inlet pipe 24 will also flow through the pipe 12 and be discharged with the oil $O_1$ in the upper chamber, and the discharge of oil through the pipe 19 will thus continue while the water is sinking in the upper chamber. When the water $W_1$ has sunk below the lower level $W_{min}$ at the end of the electrodes 31 and 32, as shown, the current flowing between these electrodes through the water will be interrupted whereby the control circuit will cause the valve 14 to be closed, and the cycle of operations has thus been completed.

It will be understood that the opening of the valve 14 at the upper level of the water $W_{max}$ and the closing of the valve at the lower level $W_{min}$ will cause the water to continuously rise and fall between these two levels, and the amount of oil $O_1$ discharged during each cycle of operations will, therefore, be precisely determined by the volume of the measuring chamber comprised between the two levels. Moreover, since each cycle of operations is determined by the electromagnetic operations of the control circuit, it will be appreciated that the number of cycles can easily be counted by means of an electromagnetically actuated counter and hence the precise amount of oil discharged through the apparatus can be measured simply by reading the figures recorded by the counter.

The auxiliary operations of the control circuit of FIGURE 2 controlling the opening and closing of the valve 14 are as follows:

A. Valve 14 closed

The circuit through the electromagnet 30 is interrupted, the magnet is deenergized and the core 16 drops down to its lowermost position thereby closing the valve 14. This is what happens while the water $W_1$ in the upper chamber 11 is rising from the lower level $W_{min}$ towards the upper level $W_{max}$. During this operation the circuit through contacts 37a and 37b and the circuit between the electrode 31 and the two other electrodes 32 and 33 are open. Therefore, no current can flow from terminal 34a through the magnet coil 30 to terminal 34b.

B. Valve 14 open

The circuit through the electromagnet 30 is closed as follows: 34a, 31a, 31, 32, 32a, 30b, 30, 30a, 35b, 35, 35a, and 34b. This happens when the water $W_1$ at the upper level $W_{max}$ short-circuits electrodes 31 and 32. The electromagnet 30 is energized, attracts the core 16 and lifts the valve 14 to the open position.

The relay 35 being inserted in the above identified circuit will lift the armature 36 thereby short-circuiting contacts 37a and 37b so as to close the auxiliary circuit: 34a, 37a, 36, 37b, 33a, 33, 32, 32a, 30b, 30, 30a and 34b.

It will be seen that so long as this auxiliary circuit is closed, the electromagnet 30 will remain energized so as to hold the valve 14 in the open position. The auxiliary circuit will remain closed so long as the two electrodes 32 and 33 are short-circuited, i.e. until the water $W_1$ has sunk just below the lower level $W_{min}$. When this happens, the auxiliary circuit is interrupted and both the relay 35 and the electromagnet 30 are deenergized, the valve 14 is again closed and the cycle is completed.

The oil pressure system

Figure 6:
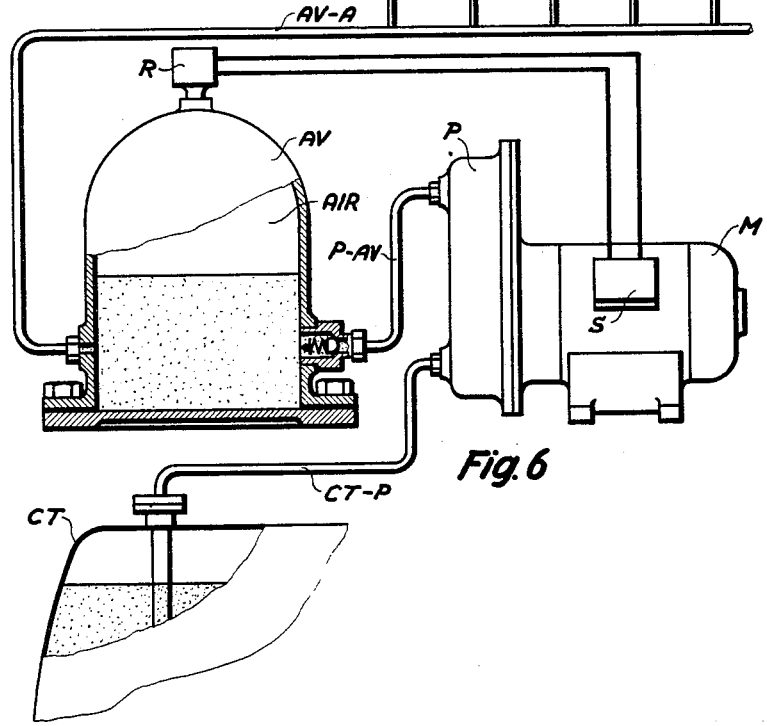
FIGURE 6 is a diagram showing a fuel oil distribution system with a plurality of consumer supply lines each provided with an oil meter comprising the apparatus according to the invention.

Referring now to FIGURE 6 oil is drawn from the central tank CT through a supply line CT–P to a feeding pump P which feeds the oil under pressure through line P–AV into the lower part of an air vessel AV. The air above the oil is compressed as the oil level $O^1$ rises within the air vessel until the air pressure has reached a predetermined value. When this happens, a pressure responsive relay R operates a switch S which automatically stops the pump motor M and hence the feeding pump P. The compressed air above the oil level $O^1$ will now press the oil through the supply line AV–A to a plurality of apparatus A and will continue to do so, until the air pressure has fallen below a predetermined lower value. When this happens, the pressure responsive relay R will again operate the switch S, starting the motor M and the feeding pump P so as to maintain a substantially constant driving pressure within the air vessel AV.

The invention thus provides for the individual supply of fuel oil to a plurality of consumer lines CL from a central supply station comprising the central tank CT and the common pressure generating plant including the feeding pump and the air vessel. The oil consumption by each consumer is accurately measured by the counter 38 pertaining to each apparatus in the same manner as the consumption of gas or electricity. In addition to the substantial economy achieved by the centralization of the oil supply there is the further advantage of eliminating the need for storage of inflammable liquids in the homes of the individual consumers which constitutes a potential danger of fire in apartment houses where each apartment is heated by oil burners.

The invention is not limited to the use of any particular material for the manufacture of the receptacle or other components of the apparatus.

It will be understood, however, that the receptacle should be made of an insulating material, and it has been found that the manufacture of the receptacle by injection moulding of a thermoplastic material such as an acrylic composition presents substantial advantages.

The pipes within the receptacle, on the other hand, may be made of any suitable material such as brass or other alloys. Alternatively, the pipes 12 and 22 may be moulded in one piece with the partition 10/20 so as to constitute a unit which can readily be assembled with the two parts of the receptacle as illustrated in FIGURE 1.

What is claimed is:

1. An apparatus for measuring the consumption of fuel oil by an oil distribution system comprising:
    (a) a vertically disposed receptacle including a measuring chamber in the upper portion thereof and an oil storage vessel containing an electrically conductive fluid non-miscible with oil in the lower portion thereof,
    (b) a partition wall between said upper measuring chamber and said lower storage vessel,
    (c) an oil input pipe interconnecting said chamber and vessel and extending upwardly from said partition wall into the measuring chamber,
    (d) an exhaust pipe interconnecting the measuring chamber and the storage vessel extending downwardly from the partition wall into the storage vessel and terminating adjacent the bottom thereof,
    (e) an oil supply pipe within the storage vessel extending upwardly from the bottom thereof and terminating adjacent the partition wall,
    (f) an oil supply line for feeding oil under pressure to the storage vessel and communicating with the interior of the supply pipe extending upwardly from the bottom thereof,
    (g) an oil output pipe at the top of the receptacle communicating with the measuring chamber and connecting said chamber with an oil distribution system,
    (h) a pair of long electrodes vertically disposed within the measuring chamber and extending from the top of the receptacle to a lower level adjacent the partition wall,
    (i) a third and short electrode vertically disposed within the measuring chamber and extending from the top of the receptacle to an upper level within the chamber adjacent the top thereof,
    (j) pressure means capable of exerting sufficient pressure on the electrically conductive fluid in the storage vessel so as to cause this fluid to be forced into the measuring chamber and to move from the said lower level to the said higher level therein, (k) valve means in the upper end of the oil input pipe within the measuring chamber and operatively associated with said pressure means for controlling supply and release of pressure acting on the electrically conductive fluid, (l) an electro-magnet operatively associated with said valve means, (m) an electric control circuit including a source of current and conductors connecting said source with said electrodes, and relay means in said circuit connected with said electrodes and responsive to currents flowing therebetween through said electrically conductive fluid, said relay means being operatively associated with said valve means for applying pressure to the electrically conductive fluid at the lower level thereof and releasing pressure from the electrically conductive fluid at the upper level thereof, (n) and a counter operatively associated with said relay means.

2. In an apparatus as defined in claim 1 wherein said electrical control circuit further comprises:

a pair of terminals connected to an electric power source, an electromagnet operatively associated with said valve means and having a pair of terminals, a terminal connected to the short electrode and a pair of terminals each connected to one of the two long electrodes, relay having a pair of terminals, a stationary contact member connected to the terminal of the short electrode, another stationary contact member connected to the terminal of one of the long electrodes, a movable contact member operatively associated with said relay so as to bridge the two stationary contacts when the relay is energized, said electromagnetically actuated counter having a pair of terminals connected across said relay so as to receive electromagnetic pulses for operating the counter when said relay is energized, said terminal and contact members being further interconnected as follows:

one power terminal to one of the relay terminals, the other power terminal to the terminal of the short electrode, one of the terminals of the electromagnet to the other relay terminal, the other terminal of the electromagnet to the terminal of the other long electrode.

References Cited by the Examiner

UNITED STATES PATENTS

| | | | |
|---|---|---|---|
| 2,043,035 | 6/36 | De Lancey | 222—73 |
| 2,325,695 | 8/43 | McAfee | 73—223 X |
| 2,697,939 | 12/54 | Martin et al. | 73—223 X |
| 2,732,100 | 1/56 | Jackson et al. | 222—73 |
| 3,001,399 | 9/61 | Smith | 73—223 |
| 3,019,649 | 2/62 | Kuntz et al. | 73—223 |
| 3,115,038 | 12/63 | Babson | 73—223 |

FOREIGN PATENTS 582,155    11/46    Great Britain.

RICHARD C. QUEISSER, *Primary Examiner.*

DAVID SCHONBERG, *Examiner.*